United States Patent [19]

Werkheiser

[11] 4,439,084

[45] Mar. 27, 1984

[54] PALLETIZER FOR NEWSPAPER BUNDLES

[75] Inventor: James S. Werkheiser, Nazareth, Pa.

[73] Assignee: Harris Graphics Corporation, Melbourne, Fla.

[21] Appl. No.: 335,839

[22] Filed: Dec. 30, 1981

[51] Int. Cl.³ ............................................. B65G 57/06
[52] U.S. Cl. ........................................ 414/62; 414/68;
  414/82; 53/535; 53/540
[58] Field of Search ................. 414/30, 35, 36, 57,
  414/62, 64, 68, 76, 82; 53/535, 537, 540, 543

[56] References Cited

U.S. PATENT DOCUMENTS

| | | | |
|---|---|---|---|
| 3,114,465 | 12/1963 | Widmer | 414/62 |
| 3,700,127 | 10/1972 | Kurk et al. | 414/62 X |
| 3,730,357 | 5/1973 | Beaty, Jr. et al. | 414/62 |
| 4,018,031 | 4/1977 | Smaw | 53/543 X |
| 4,024,965 | 5/1977 | Marth et al. | 414/64 X |
| 4,073,387 | 2/1978 | Bowser | 414/76 X |
| 4,271,755 | 6/1981 | Kintgen et al. | 414/62 X |

Primary Examiner—Robert J. Spar
Assistant Examiner—Ken Muncy
Attorney, Agent, or Firm—Yount & Tarolli

[57] ABSTRACT

An automatic palletizer for newspaper bundles is disclosed. Bundles arriving on an infeed conveyor are oriented according to a predetermined stacking pattern. A row staging area receives the oriented bundles, and a row sweep moves completed bundles into a layer staging area. A reciprocating layer sweep has a blade that can be raised or lowered to move completed layers from the layer staging area onto a retractable floor which then opens to drop the bundles onto a pallet below. Each layer is compacted before being dropped and guide means control the movement of the bundles as they drop onto the pallet. The palletizer forms either complete layers or partial layers, the layer sweep having a shorter stroke when moving partial layers. An upstream group of rollers in the layer staging area can be selectively driven or braked to form a gap at either of the two starting positions of the layer sweep into which gap the blade may be lowered. A mechanism accurately locates the pallet below the retractable floor.

18 Claims, 16 Drawing Figures

LAYER 1

LAYER 2

LAYER 3

LAYER 4

PALLETIZER FOR NEWSPAPER BUNDLES

BACKGROUND OF THE INVENTION

The present invention relates to a palletizer for automatically loading bundles of newspapers on pallets.

Automatic pallet loaders are well known. These loaders receive a stream of articles, orient them properly, form them into rows, group the rows into layers and deposit the layers sequentially on a pallet. Prior palletizers of this type have been used to palletize bundles of newspapers.

Palletizing bundles of newspapers presents problems because of the size and shape of the newspaper bundles. Newspapers are usually folded to a rectangular shape about 12 by 15 inches and a stack of such newspapers has a generally rectangular plan view. However, newspaper bundles do not form a uniform square stack in side or end views. This is due to the fact that the strap for the bundle compresses the center portion of the stack. As a result the bundles may "butterfly" in side view and may have rounded corners in an end view. A folded newspaper is necessarily slightly thicker along the folded edge opposite from the headline, with the result that a stack of newspapers has a trapezoidal profile or elevation view. Although a compensated stack made with half of the folded edge facing one way and half the folded edges facing the other way can make the stacks more nearly rectangular, the rounded corners and butterfly effect remain. The irregular shape of newspaper bundles make them difficult to palletize automatically.

Prior pallet loaders for handling newspaper bundles have not been effective to stack the irregularly shaped newspaper bundles in a fast operation. Moreover, they have not been capable of forming a top layer of bundles having a different number of bundles than the other layers.

SUMMARY OF THE INVENTION

The present invention provides a pallet loader for loading newspaper bundles on pallets. The pallet loader receives a stream of newspaper bundles, rotates the bundles according to the desired stacking pattern, forms successive bundles into rows, forms successive rows into layers, and deposits completed layers on top of each other on a pallet until the pallet load is complete. The pallet loader includes a controller which controls the number of bundles loaded onto each pallet according to the destination of the pallet load. If a pallet for a specific destination requires a number of bundles which does not form a whole number of complete layers, a partial top layer is formed on the pallet. The pallet loader may then position the top layer offset inwardly from the edge of the preceeding layers to make a stable stack.

The bundles are received on an infeed conveyor which includes an orientation station where selectively actuatable arms rotate the bundles to the required orientation. The bundles, now properly oriented according to the desired stacking pattern, continue moving on the infeed conveyor and arrive at a row staging area where the bundles are formed into rows. A row sweep moves completed rows transversely to the direction of the infeed conveyor onto a layer staging area. The process is repeated moving three successive rows onto the layer staging area until a complete layer is built. A layer sweep then engages the trailing side of the most recently arrived row and moves the entire layer to a position on a retractable floor centered above a pallet. The layer sweep compresses the layer against a layer register stop, and then the retractable floor opens to drop the entire layer onto the pallet.

The layer sweep reciprocates on a track above the layer staging area. The layer sweep includes a blade which drops down behind the last row of the layer to be moved and in front of the first row of the succeeding layer. Each complete layer is formed of two successive rows of three bundles side by side and one row of four bundles end to end, with the row of four being slightly longer than the rows of three because of the rectangular proportions of the bundles. The layer sweep moves the complete layer onto the retractable floor and stops when the rows have been compressed against a layer register stop. The result is that the layer is squeezed and compacted in the direction of movement of the layer sweep.

The layer sweep can start its stroke from either of two positions. The layer sweep makes its longest stroke starting from a location adjacent the row staging area when moving a complete, three-row, layer onto the retractable floor. A shorter stroke is used when only a partial layer is to be moved. A group of rollers between the row staging area and the layer staging area may be selectively driven or braked to provide a gap between successive rows into which gap the blade of the layer sweep is lowered.

The row of four bundles in each layer is also squeezed and compacted in the direction perpendicular to the direction of movement of the layer sweep. A pair of fixed squeeze plates adjacent the layer staging area and a pair of cam operated paddles connected with the blade of the layer sweep compact the rows of four lengthwise to assure they are properly located above the pallet below. The rows of three are not compacted because their shorter length permits a larger tolerance in their location.

The palletizer also includes guides which control the orientation of the bundles as they are dropped onto a pallet, and so reduce the chances of a bundle becoming skewed as it lands on the stack on the pallet. A pair of fixed plates extend outward from the layer register stop to limit endwise movement of the bundles in the leading row of a layer. The fixed squeeze plates limit endwise movement of the bundles in the middle row, and the movable paddles on the blade of the layer sweep guide the last or trailing row as the layer is dropped onto the pallet below. The layer register stop and the blade of the layer sweep limit movement of the bundles in the direction perpendicular to endwise movement as the layer drops.

A unique pallet feed mechanism is provided which positions a pallet centered under the retractable floor. Specifically, the pallet is fed onto a lift platform by a roller conveyor. The pallet's movement is halted by a spring loaded pallet register stop which extends upward from the conveyor surface to locate the pallet below the retractable floor but laterally offset from the desired position centered under the retractable floor. As the pallet is lifted on the lift platform and before the first layer of bundles is dropped onto it, the edge of the pallet hits a cam which moves the pallet to the desired position. When the full pallet is lowered, it lands on top of the register stop. The register stop is thereby moved downward to be even with the conveyor surface and accordingly it no longer blocks pallet movement. The full pallet is carried away by the conveyor.

BRIEF DESCRIPTION OF THE DRAWINGS

The foregoing and other features and advantages of the present invention will become more apparent to those skilled in the art to which it pertains upon a consideration of the following description taken together with the accompanying drawings in which.

DESCRIPTION OF PREFERRED EMBODIMENT

Figure 1:
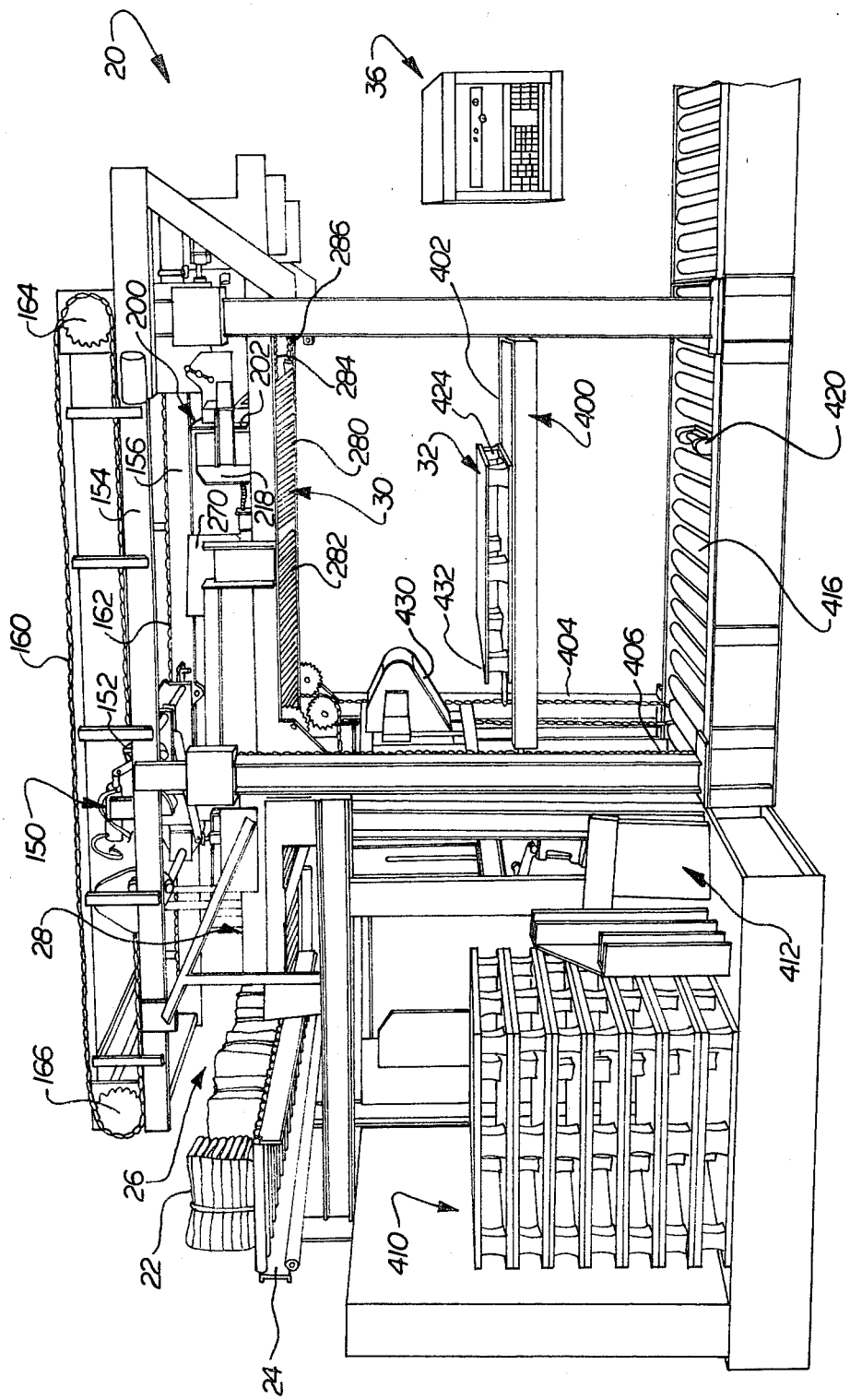
FIG. 1 is a pictorial illustration of a palletizier constructed in accordance with the present invention.
Figure 2:
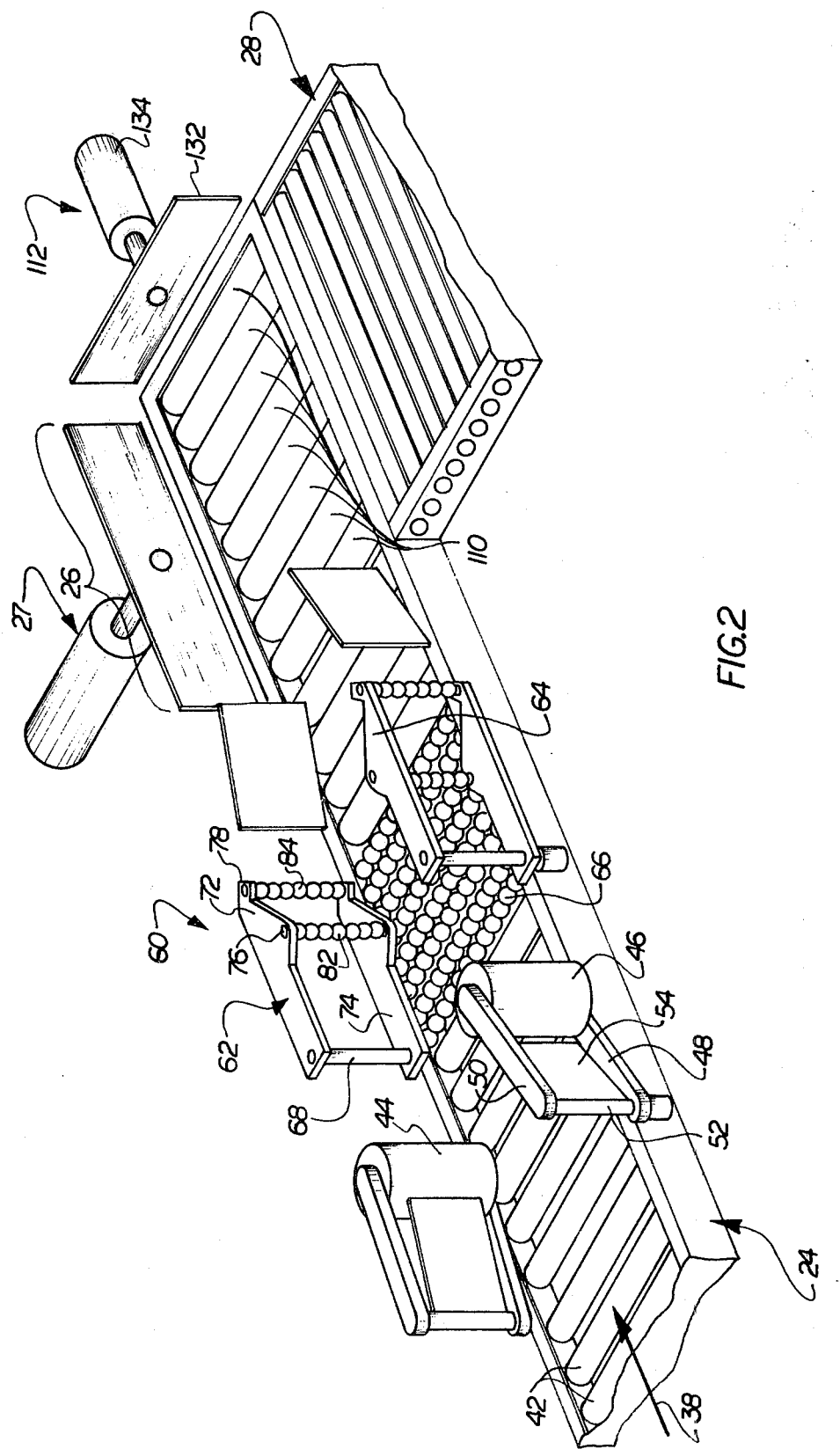
FIG. 2 is a perspective, schematic illustration of an infeed conveyor and row staging area forming a part of the palletizer of FIG. 1.

A palletizer 20 illustrated in FIG. 1 receives bundles 22 of newspapers on an infeed conveyor 24. The bundles are formed into rows in a row staging area 26. Completed rows are moved by a row sweep 27 (FIG. 2) in a direction perpendicular to the direction of the infeed conveyor 24 into a layer staging area 28. Completed layers are then moved by a layer sweep (to be discussed more fully below) onto a retractable floor 30 (FIG. 1). When the retractable floor retracts, a layer on the floor 30 is dropped to rest either directly on a pallet 32 or on top of the layer(s) already on the pallet.

The development of high speed presses, stackers and tyers, and stuffers requires that the palletizer 20 be able to palletize bundles of newspapers at a high rate of speed, preferably 60 bundles per minute. In addition to the high speed requirement, the palletizer 20 must be able to handle effectively bundles which are not evenly shaped. A bundle of newspapers is approximately 12"×15" in plan view, and generally newspapers are stacked into bundles about 12" high. However, the strap used to bind the papers into a bundle causes the bundle to have rounded corners in an end view and a butterfly shape in side view.

The palletizer 20 compacts the arrangement of the bundles in each layer, both lengthwise and widthwise to tighten and stablize the resulting layer. Each layer is built with bundles arranged and oriented so that the layers nest with one another to make a stable load. The palletizer 20 includes a controller 36 which controls the loading of each pallet with the proper number of bundles of newspapers, depending on the destination of the pallet. In the event that a pallet requires a number of bundles which does not form a complete layer, the partial layer is positioned on top of the preceeding complete layer and may be offset from the edges of the underlying complete layer so that the partial layer will be stable.

The infeed conveyor 24 (FIG. 2) receives bundles of newspapers which arrive travelling in the direction of the arrow 38 with their folded edges leading. The bundles may be arriving as fast as one per second. The infeed conveyor 24 includes a plurality of rollers 42 which are rotatable about generally horizontal axes. The rollers 42 are driven in a conventional manner to move the bundles.

As the bundles travel in the direction of the arrow 38, they are accelerated in order to increase the spacing between them. To this end, the rollers 42 are driven at a higher speed than the rollers of the equipment (not shown) upstream of the rollers 42. In addition, a pair of power driven rollers 44 and 46 engage the vertical sides of each bundle to accelerate the bundle further.

The power driven roller 46 is mounted for rotation about a generally vertical axis and is supported by arms 48 and 50 which pivot about a vertical pin 52 which is connected to the side of the conveyor 24. A guide plate 54 extends between the pin 52 and the edge of the roller 46. The arms 48 and 50 are spring biased (FIG. 3) to urge the roll 46 inward toward the center of the conveyor 24 and therefore into engagement with the side of the bundles passing down the conveyor The roller 44 is similarly mounted and biased inward.

After passing through the acceleration rollers 44 and 46 (FIG. 2) the bundles arrive in an orientation section 60. As previously mentioned, the bundles arrive on the infeed conveyor with the folded edge of the newspaper leading. The orientation section 60 has a pair of pivotable arms 62 and 64 which are used to change the orientation of selected bundles by rotating them.

To facilitate rotation of the bundles, the orientation section 60 includes a plurality of balls 66 which are mounted on power driven shafts (not shown) which are generally parallel to the rollers 42. Each of the balls 66 includes an overrunning clutch (not shown) which connects it with the shaft on which it is mounted. In this way the balls 66 are driven at a minimum speed by the shaft, but when a bundle is rotated, the balls are allowed to turn faster than the shaft on which they are mounted.

The arm 62 includes a shaft 68 which extends vertically upward from the side of the conveyor 24 and is pivotably mounted thereto. The arm 62 is formed of an upper plate member 72 and a similar lower plate member 74 both of which are fixedly connected with shaft 68. Extending between the two plate members 72 and 74 are a pair of rods 76 and 78 which carry a plurality of freely rotatable balls 82 and 84, respectively. A hydraulic cylinder 90 (FIG. 3) is operable to move the arm 60 into the position shown in phantom in FIG. 3 in which the rollers 82 and 84 catch the leading corner of a bundle moving through the orientation section 60 and cause the bundle to rotate counterclockwise The arm 64 is similar to the arm 62 and is operated by a cylinder 92. When the arm 64 is pivoted inward, bundles are rotated clockwise as viewed in FIG. 3 so that the folded edge is toward the bottom of the Figure. The purpose and sequence of rotating bundles using the arms 62 and 64 will be discussed more fully below.

Once a bundle is rotated to the desired orientation, it passes through a second set of guide plates 100 and 102 which are fixed to the sides of the infeed conveyor 24. The guide plates 100 and 102 serve to center the bundles on the infeed conveyor 24. To this end, the guide plates 100 and 102 extend upward and are tapered toward each other, being closer together at the downstream end where they are a little more than 15 inches apart.

Figure 3:
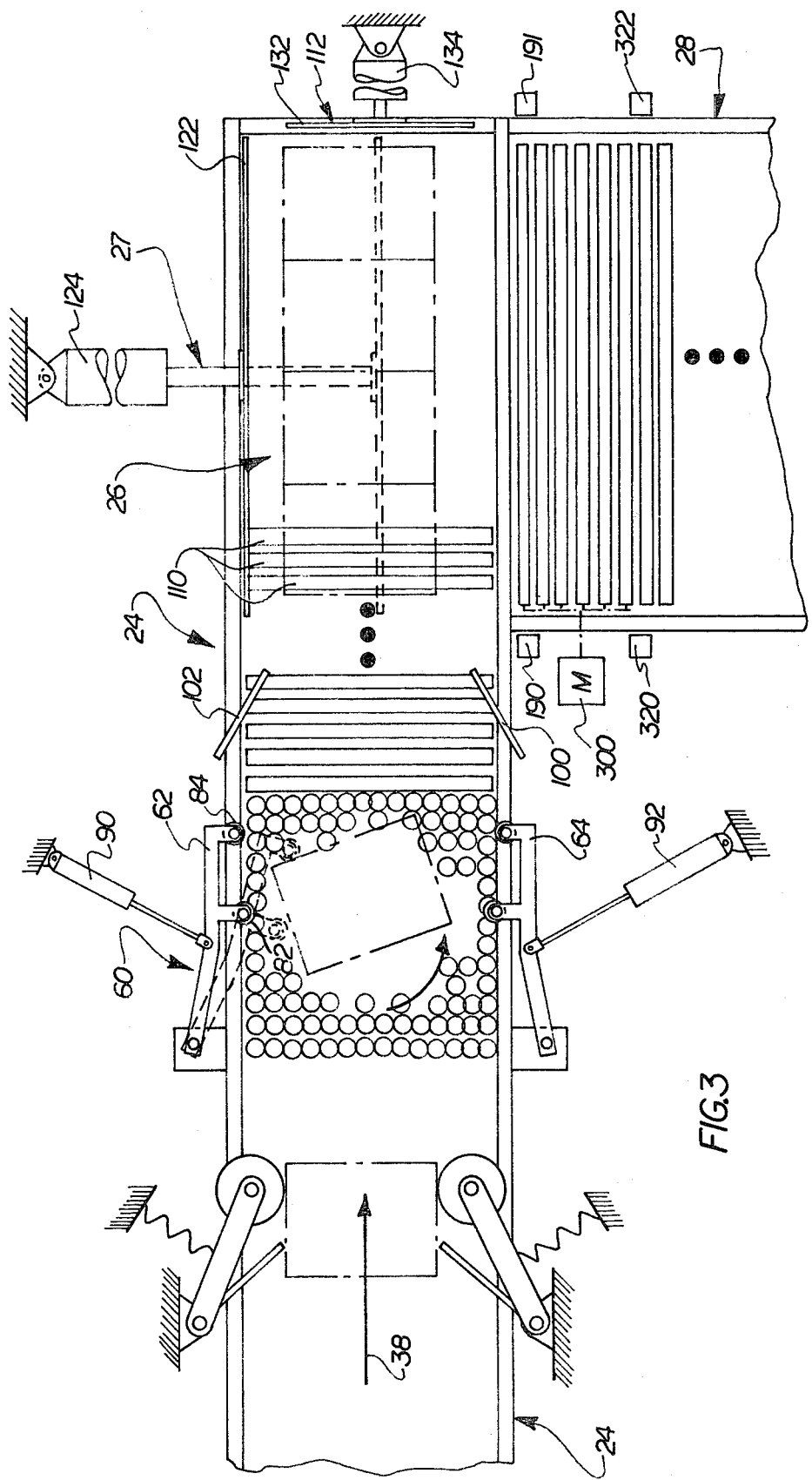
FIG. 3 is a schematic plan view of the portion of the palletizer illustrated in FIG. 2.

After the bundles have passed through the guide plates 100 and 102 they enter the row staging area 26 (FIG. 3). The row staging area 26 includes power driven rollers 110 which are parallel and co-planar with the rollers 42 of the infeed conveyor 24.

The first bundle in a row which arrives in the row staging area 26 is carried by the rollers 110 into abutting engagement with the row stop 112. If this bundle is a bundle which has not been rotated by one of the arms 62 or 64, the folded edge of the first bundle abuts the row stop 112. There follows in succession a second, third and perhaps a fourth bundle (depending upon the stacking pattern being used).

As soon as a row is complete, it is ejected from the row staging area 26 by the row sweep 27. The row sweep 27 has a generally vertical plate 122 which extends along the length of a side of the row staging area. The plate 122 is connected with a power cylinder 124 which can move the row sweep plate 122 rapidly to eject a row from the row staging area in a direction perpendicular to the direction the bundles were traveling on the infeed conveyor 24. The completed row is moved by the row sweep 27 into the layer staging area 28 and the cylinder 124 returns the plate 122 to its rest position illustrated in FIG. 3 before the next bundle arrives in the row staging area 26.

FIGS. 4A–4D illustrate in a plan view four successive layers of bundles. The arrangement of the bundles in each layer is designed for maximum stability and compactness when the layers are stacked on a pallet. Bundle B1 of row 1 of layer 1 (FIG. 4A) is the first bundle to arrive on the infeed conveyor 24. Bundle B1 is rotated clockwise by arm 64 (FIG. 3) as is indicated schematically by the dotted line 126, representing the headline portion of the newspapers in each bundle. After being rotated, bundle B1 moves on rollers 110 into engagement with the row stop 112. Subsequently bundle B2 and B3 are also rotated clockwise 90 degrees from their original orientation, and they move until they abut the preceding bundles. When row R1 is complete with bundles B1, B2 and B3, the row sweep 27 moves row R1 into the layer staging area 28. Subsequently bundles B4, B5 and B6 arrive in the row staging area 26 to form row R2, each bundle also having been turned 90 degrees by arm 64 to the same orientation as the bundles in row R1. Row R2 is then ejected from the row staging area 26 by the row sweep 27.

Row R3 is formed of four bundles, B7, B8, B9 and B10. These bundles pass through the orientation section 60 with both of the arms 62 and 64 retracted, and consequently bundles B7-B10 are not rotated and retain their original, fold-first orientation. The row sweep 27 then moves row R3 onto the layer staging area 28 to take its place as the third and final row of layer 1.

After layer 1 is completed, it is moved by a layer sweep 150 (FIG. 1) (to be described below) from the layer staging area 28 onto the retractable floor 30 which in turn deposits layer 1 on pallet 32. The action of the layer sweep 150 clears the layer staging area 28 for formation of layer 2.

Layer 2 (FIG. 4B) is composed of three rows, R4, R5, and R6. Row R4 consists of four bundles B11-B14 which are oriented in the same way as bundles B7-B10 of row R3. When all four bundles B11-B14 have arrived in the row staging area 26 (FIG. 3), the row sweep 27 moves the entire row laterally into the layer staging area. Bundle B15, which is the first bundle of row R5 to arrive in the row staging area 26 is rotated to counterclockwise from its original orientation by arms 62. Similarly, bundles B16 and B17 are also rotated counterclockwise from their original orientation.

Figure 6:
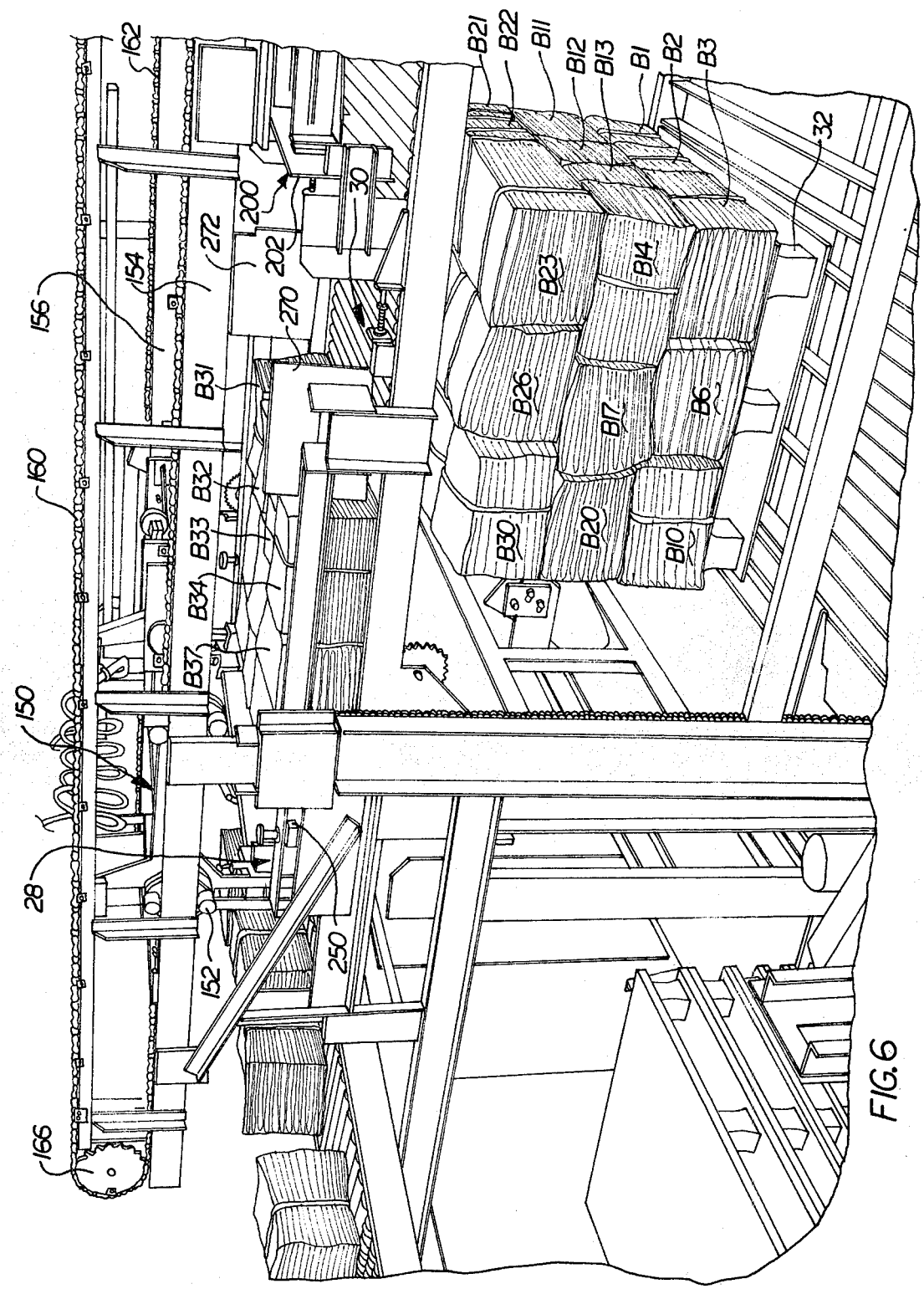
FIG. 6 is a pictorial illustration of a portion of the palletizer shown in FIG. 1 and showing three layers in place on a pallet and a fourth layer in the layer staging area.

When row R5 is complete, the row sweep 27 moves the entire row R5 out of the row staging area 26 into the layer staging area. Row R6, the last row in layer 2, is composed of bundles B18-B20 which are oriented to face the same way as bundles B15-B17 of row R5. When layer 2 is complete, it is moved out of the layer staging area 28 and then deposited on top of layer 1. When on the pallet, row R4 of layer 2 lies over row R1 of layer 1 and a portion of row R2 of layer 2, as illustrated in FIG. 6.

Layer 3 (FIG. 4C) includes rows R7 and R8 with three bundles B21-B26 each of which have been rotated counterclockwise by extending arm 64. Rows R7 and R8 are followed by row R9 which has four bundles which pass through orientation section 60 without being rotated. When layer 3 is placed on top of layer 2, row R9 covers row R6 and a portion of row R5.

Layer 4 (FIG. 4D) is likewise formed of three rows, R10, R11 and R12, with row R10 being formed of four bundles B31-B34 which pass through orientation section 60 without being rotated. Rows R11 and R12 each are formed of three bundles which have been rotated clockwise by actuation of arm 64. A fifth layer identical to layer 1 may be placed on top of layer 4 to complete the load on a pallet.

Because the bundles are 12"×15", row R3 is 48" long while rows R1 and R2 are only 45" long. The rows of four, rows R3, R4, R9 and R10 are 48" long because the bundles are 12" wide. The rows of three are 45" long because the 15" side of the bundles are oriented lengthwise. Therefore, the rows of three bundles are three inches shorter than the rows of four bundles and the entire layer therefore is 48"×39", ignoring any spaces between the bundles.

To assure that the rows of three which are shorter will be centered with respect to the rows of four, the row stop 112 (FIGS. 2 and 3) is adjustable. The row stop 112 includes a flat plate 132 which is connected with a cylinder 134. The cylinder 134 has a one and one-half inch stroke, and when rows of four bundles are being formed, the cylinder 134 is retracted. However, when a row of three is being formed, the cylinder 134 is extended an inch and a half so that the rows of three are centered with respect to the rows of four.

It should be noted that the arrangement of bundles in layers 1-4 (FIGS. 4A-4D and 6) not only permits the layers on the pallet 32 to be stabilized by the overlapping of the joints between the bundles, but also permits the orientation section 60 to work in a most efficient and high speed manner. The arrangement of bundles is such that one of the arms 62 or 64 is extended and operates on six successive bundles before it is retracted. Thereafter, a series of eight bundles forming two rows of four each passes through with both of the arms 62 and 64 retracted. Next the other one of the two arms 62 and 64 is extended to operate on six successive bundles and then it is retracted, and the cycle repeated.

Figure 4A:
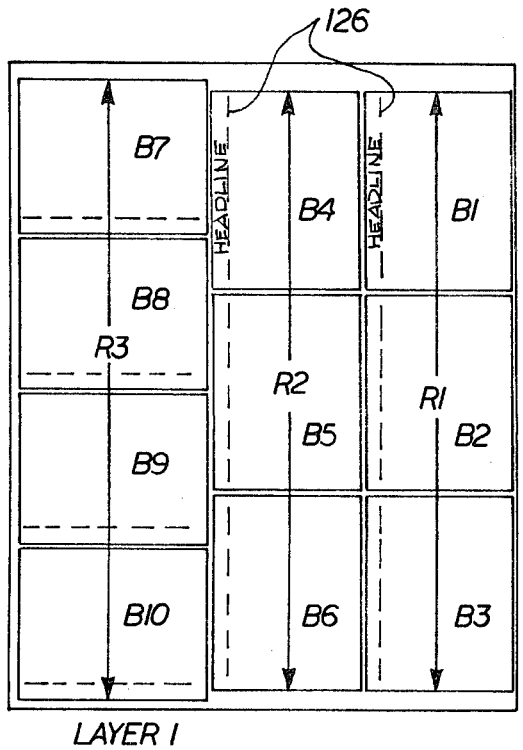
FIGS. 4A-4D illustrate an arrangement of bundles in four successive layers placed on a pallet by the palletizer of FIG. 1.
Figure 4B:
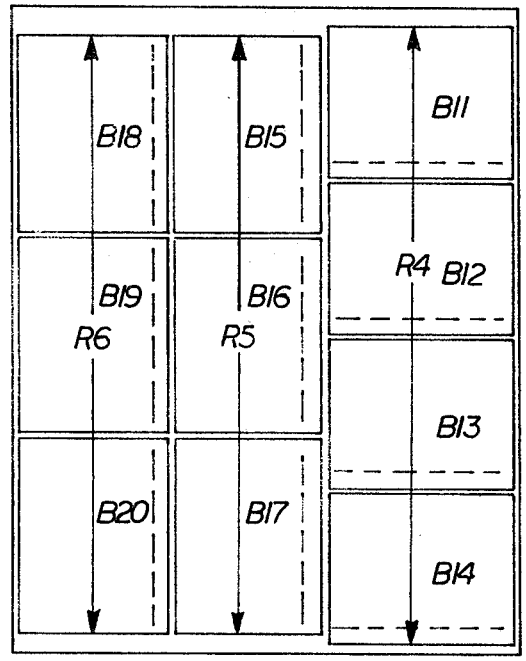
Figure 4C:
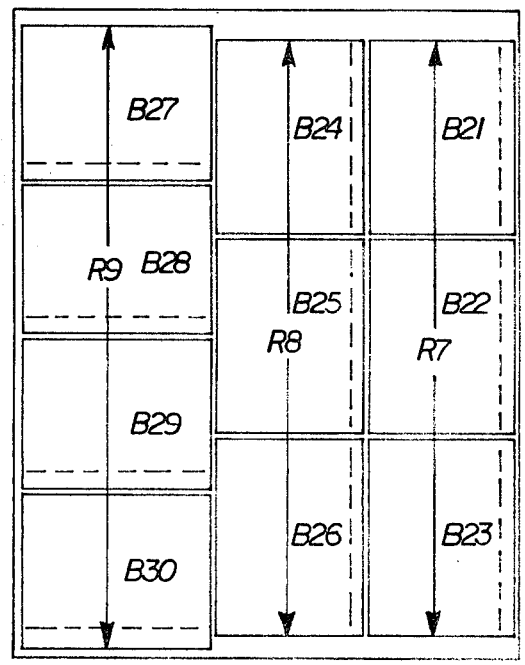
Figure 4D:
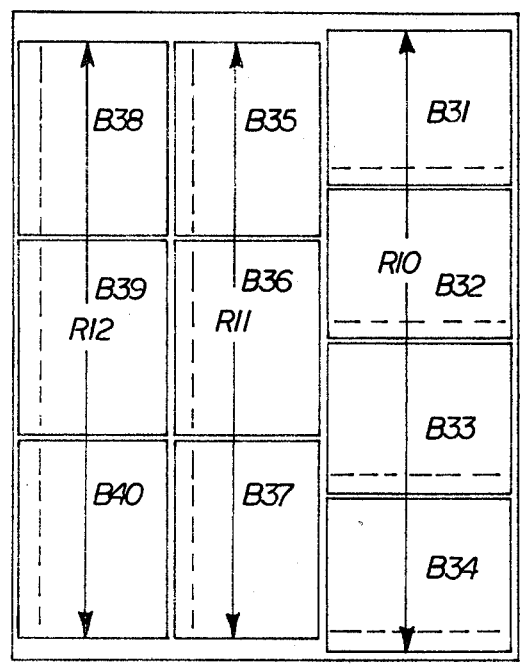

It has been found that bundles of newspapers printed on certain types of print rotate counterclockwise more easily than they rotate clockwise. When palletizing such bundles and when the bundles are nearly rectangular in end view, it may be desirable to use only arm 62 (FIG. 2) instead of both arms 62 and 64. In this case all layers include a row of four bundles which pass through the orientation section 60 without being turned and six bundles which have been turned counterclockwise. Thus, layers 2 and 3 as illustrated in FIGS. 4B and 4C, respectively, are the only two layer arrangements required. The position of the row of four bundles, i.e., rows R4 and R9, alternates between being the first and being the last row in the layer, but the rows of three are all turned the same way.

Figure 5:
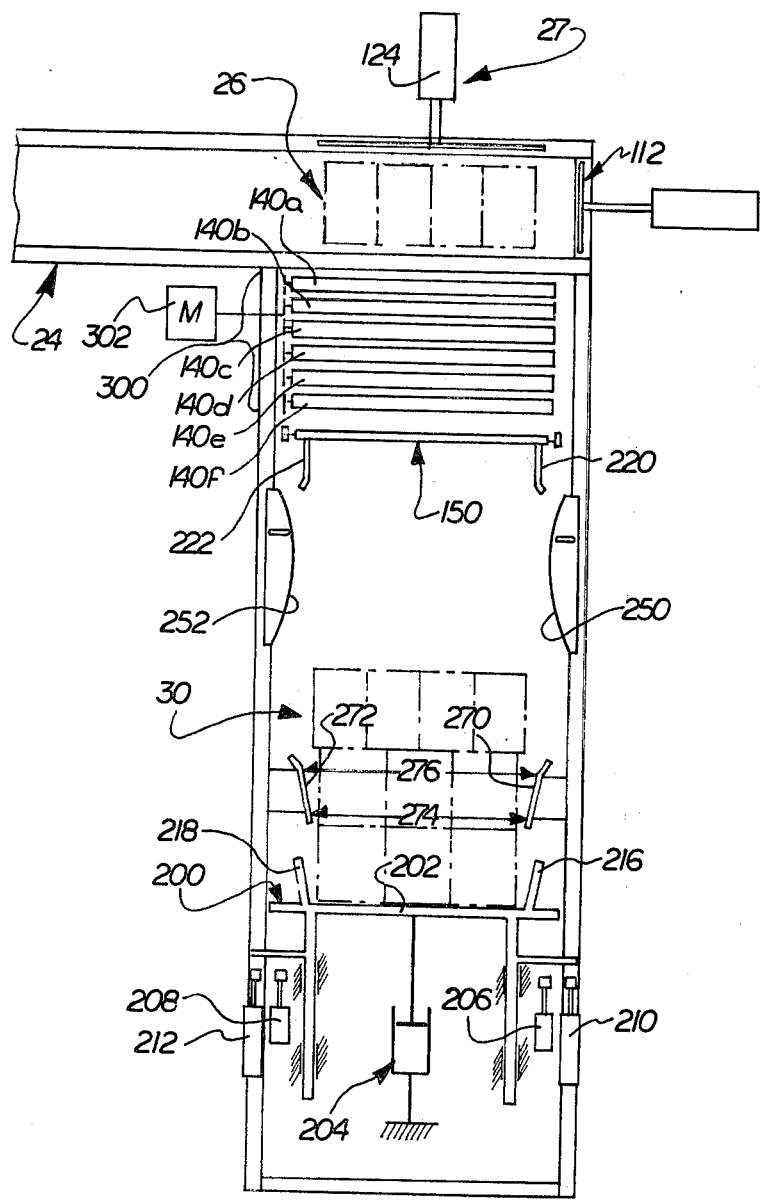
FIG. 5 is a schematic plan view of a layer staging area forming a portion of the palletizer of FIG. 1.

As previously mentioned, completed rows are pushed from the row staging area 26 into the layer staging area 28 (FIG. 5). The layer staging area 28 includes horizontal rollers 140 (FIG. 5) for supporting the rows in the layer staging area. The rollers 140 are co-planar with the rollers of the infeed conveyor 24, but are perpendicular thereto. The six rollers 140a–140f which are closest to the row staging area 26 are motor driven for reasons to be discussed below, but the remaining rollers 140 are idler rolls which turn freely to facilitate movement of the bundles. The layer staging area 28 is as wide as the rows of bundles are long measured in the direction of the axes of rollers 140 and longer than three rows are wide. Therefore, the layer staging area 28 can accommodate a complete layer composed of three separate rows with clearance at each end.

When a layer in the layer staging area 28 is complete, a layer sweep 150 (FIG. 6) moves the layer from the layer staging area 28 onto a retractacble floor 30. The layer sweep 150 includes a carriage 152 which is slidable along rails 154 and 156 which extend perpendicular to the path of the infeed conveyor 24. The rails 154 and 156 support the carriage 152 for movement between the layer staging area 28 and the retractable floor 30. The carriage 152 is moved by a chain 160 which follows the path of the rail 154 and is trained around sprockets 164 and 166 (FIG. 1) which are located at opposite ends of the rail 154. A similar chain 162 and pair of sprockets (not shown) are connected with the opposite side of the carriage 152 and follows the path of the rail 156. One of the sprockets 164 and 166 and a corresponding sprocket connected with chain 162 is connected with a reversible motor which causes the sprocket to rotate and thus moves the carriage 150 along the rails 154 and 156.

Figure 7:
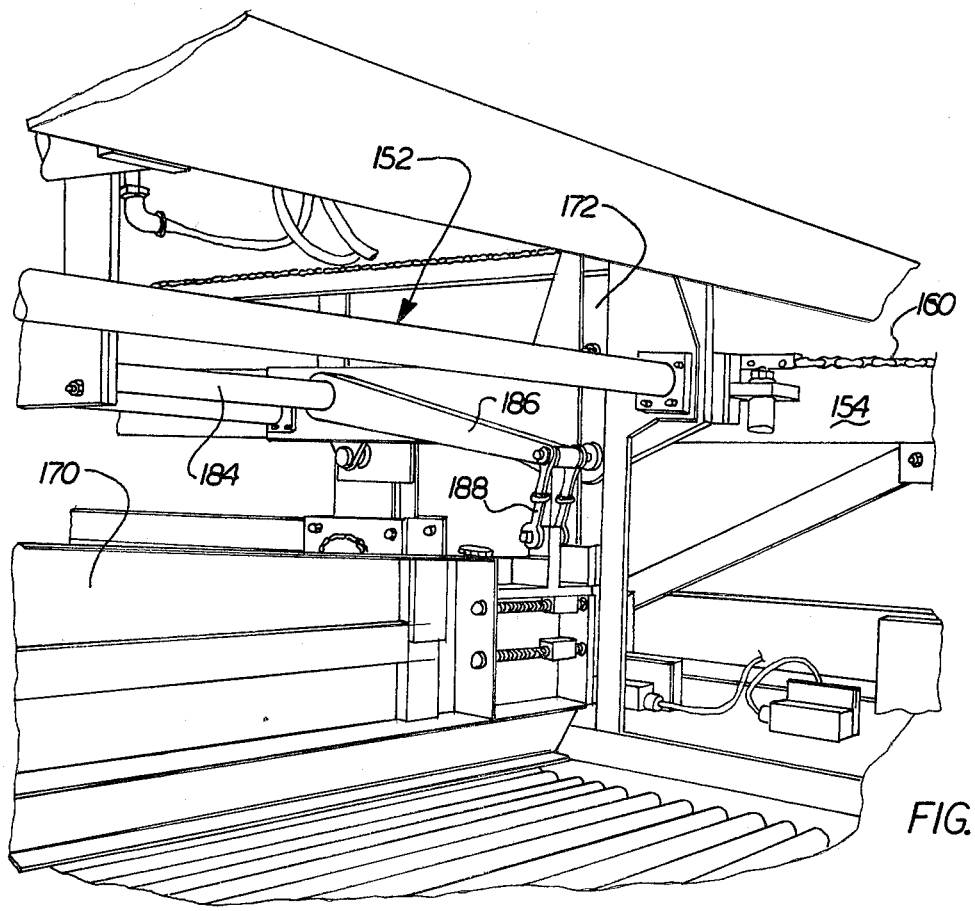
FIG. 7 is a pictorial illustration of a layer sweep forming a part of the palletizer illustrated in FIG. 1.
Figure 8:
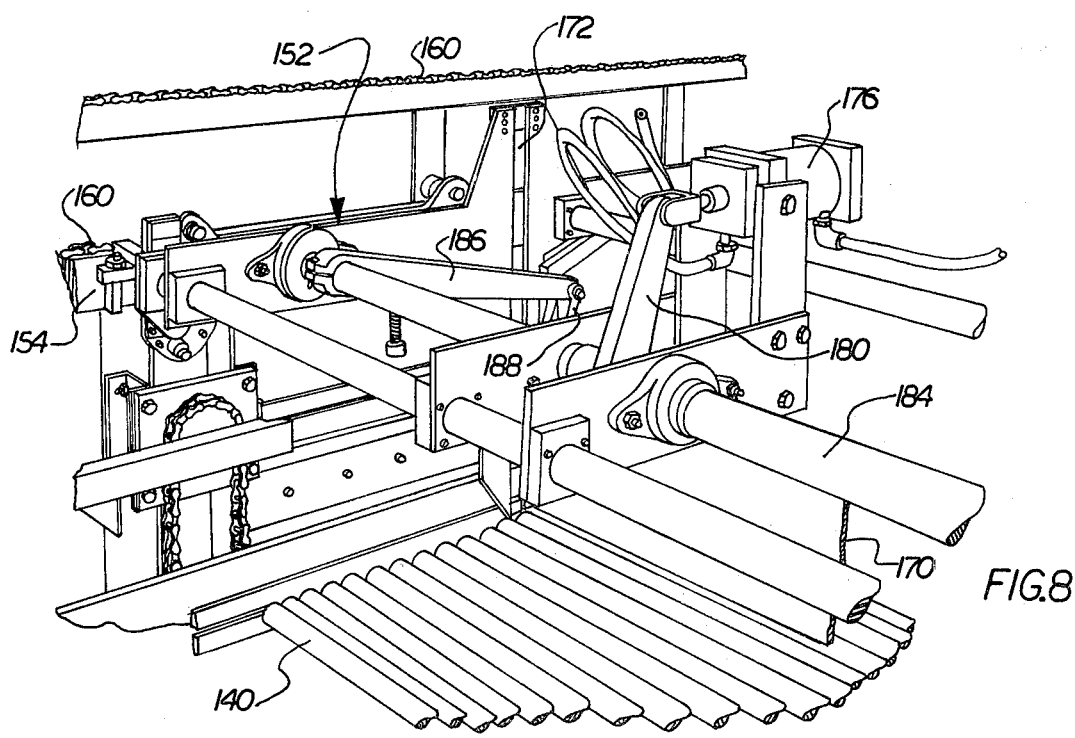
FIG. 8 is another view of the layer sweep shown in FIG. 7.
Figure 9:
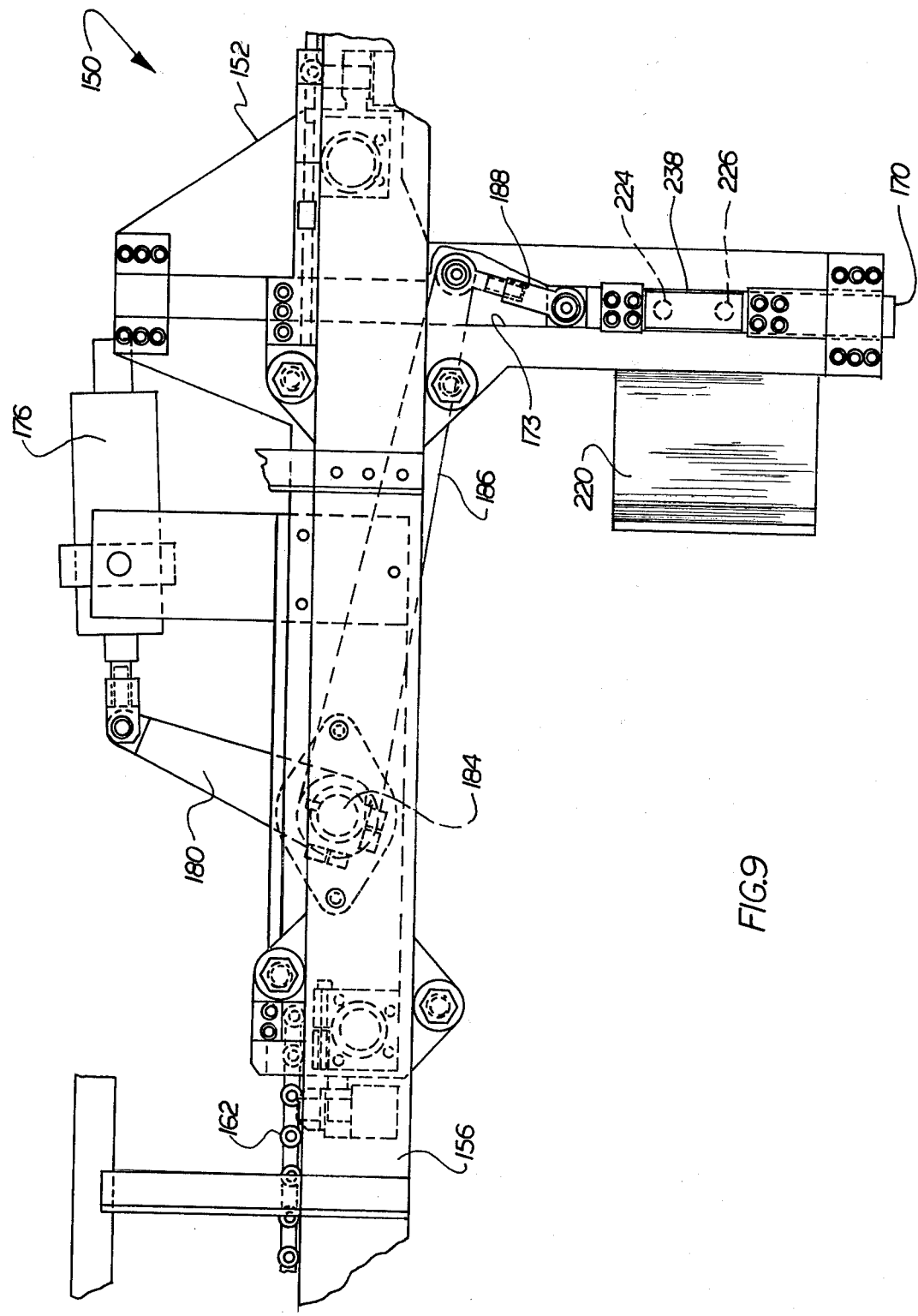
FIG. 9 is a side elevation view of a portion of the layer sweep shown in FIGS. 7 and 8.

The carriage 152 carries a blade 170 (FIGS. 7, 8 and 9) which is vertically movable in a slot 172 on the side of the carriage adjacent to rail 154 and a corresponding slot 173 (FIG. 9) in the side of the carriage adjacent the rail 156. The blade 170 is raised and lowered by an air cylinder 176 which operates through an arm 180 to rotate a shaft 184. In turn, a pair of arms 186 (only one shown) are connected to opposite end portions of the shaft 184, and a link 188 connects an end of the each arm 186 with the blade 170. When the piston of the air cylinder 176 is extended, the shaft 184 rotates lifting the arm 186, the link 188, and the blade 170. The blade 170 in its lifted or upper position is far enough above the level of the rollers 140 in the layer staging area 28 so that it will clear the top of any bundles in the layer staging area. When lowered, the blade 170 will engage any bundles in the layer staging area 28 as the carriage 152 moves.

Figure 11:
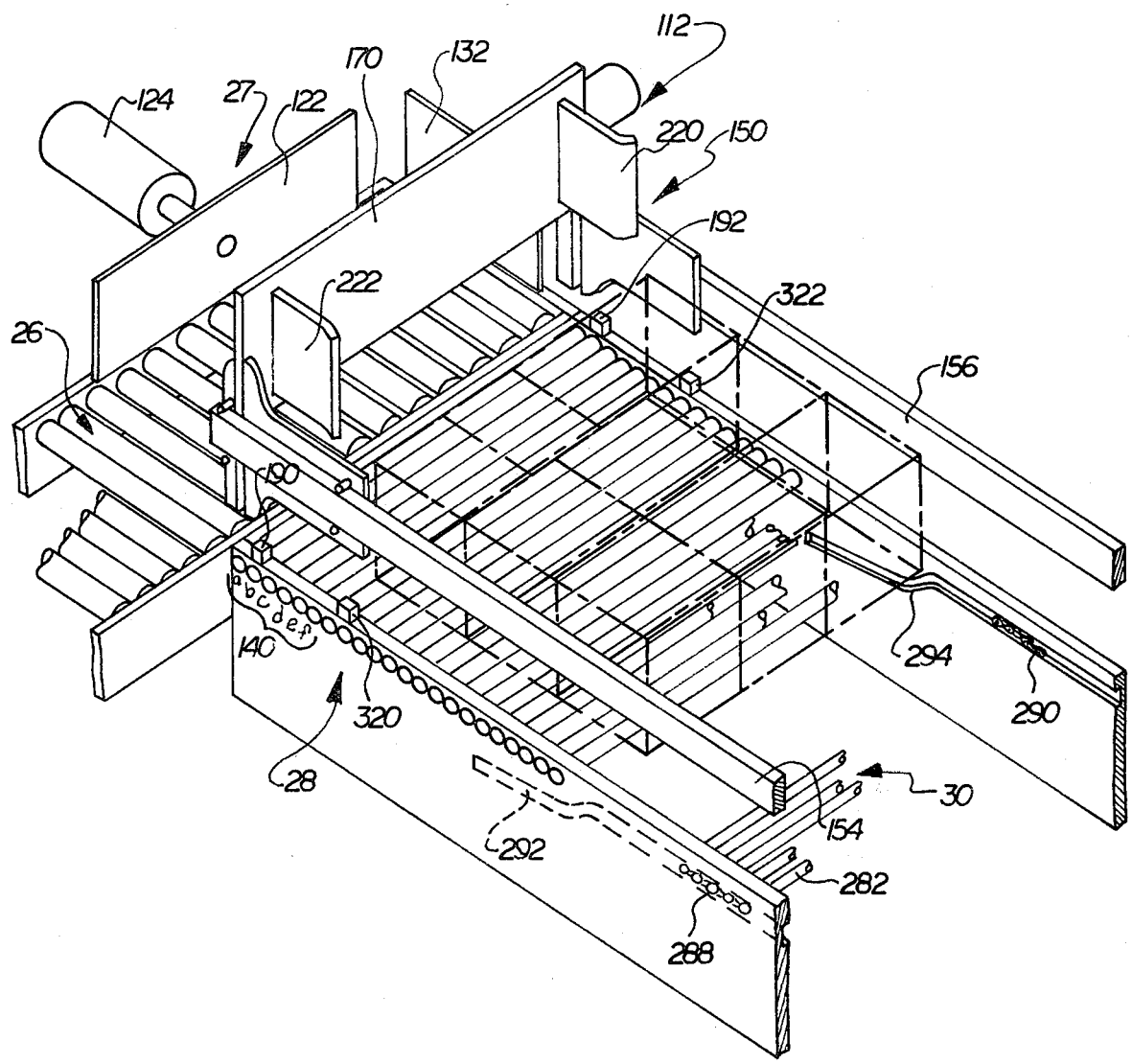
FIG. 11 is a schematic illustration of the layer sweep of FIGS. 7-10 prior to moving a complete layer from the layer staging area onto the retractable floor.

The operating cycle of the layer sweep begins when the third and final row of a layer has been moved by the row sweep 27 into the layer staging area 28 as shown in phantom in FIG. 11. The carriage 152 is in a position in which the blade 170 is behind the last row of the layer as illustrated in FIG. 11. A light source 190 and photo detector 192 determine whether there is a clear space behind the last row. If the space is clear, the cylinder 176 is retracted to lower the blade, and the chains 160 and 162 are driven to pull the carriage 152 toward the right as viewed in FIGS. 1 and 11. This moves the layer from the layer staging area 28 onto the retractable floor 30 which supports the layer over the pallet 32.

The retractable floor 30 then opens allowing the layer of bundles to drop onto the pallet 32. A layer register stop 200 (FIG. 5) is positioned at the end of the retractable floor 30 remote from the layer staging area 28. The carriage 152 moves the layer across the layer staging area and onto the retractable floor 30 and squeezes the entire layer against the layer register stop 200 and then backs up slightly to release the layer. This action eliminates any excessive spaces between the bundles and allows the a compacted layer to drop easily onto the pallet. While the retractable floor 30 is opening, the carriage 152 remains stationary with the blade 170 in its lowered position to guide the bundles as they drop onto the pallet.

The register stop 200 serves to position the layer in proper registration with the pallet 32 (FIG. 1) located below. The layer register stop 200 includes a flat plate 202 which extends vertically the height of a bundle, approximately 12 inches, and the width of a layer, approximately 48 inches. The plate 202 is mounted for sliding movement in the direction of movement of the carriage 150. A shock absorber 204 (FIG. 5) is connected between the plate 202 and the frame of the palletizer 20 to cushion the impact of the layers moved by the layer sweep 150.

Cylinders 206 and 208 are located at opposite sides and behind the plate 202 of the layer register stop. The cylinders 206 and 208 are actuated after the layer sweep 150 has pressed a layer against the layer register stop. These cylinders 206 and 208 have a relatively short stroke, approximately two inches, and serve to return the flat plate 202 to a position properly aligned with an underlying edge of the pallet 32. As will be discussed more fully below, a second pair of cylinders 210 and 212 which have a longer stroke, approximately 8 inches, are used when it is desired to position a partial layer offset six inches toward the center of the underlying pallet.

The layer register stop 200 also carries flat guide plates or paddles 216 and 218 (FIG. 5) which extend outwardly from plate 202 and are about the height of a bundle of newspapers. The guide plates 216 and 218 are spaced apart slightly more than 48 inches, the length of a row of four bundles The guide plates 216 and 218 limit endwise movement of the bundles in the leading row of a layer, e.g., row R1 of layer 1 (FIG. 4A), and guide the bundles e.g., B1-B3, as they drop onto the pallet below.

Figure 10:
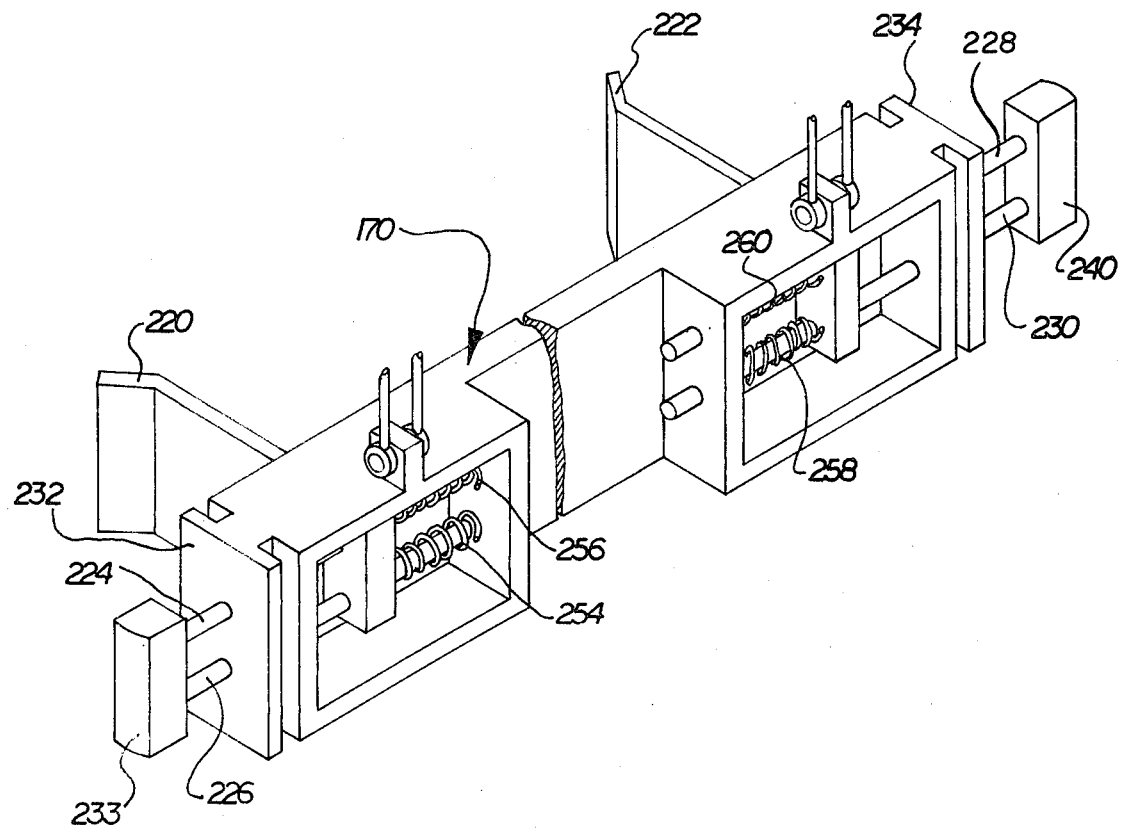
FIG. 10 is a schematic illustration of a portion of the layer sweep of FIGS. 7-9.

As previously mentioned, the layer sweep 150 squeezes the layers lengthwise to eliminate spaces and to form a compact layer. A mechanism is also provided to compact the four bundle rows lengthwise to eliminate spaces between bundles. FIGS. 4A–4D shows that the longer rows of four bundles, that is, rows R3, R4, R9, and R10 are always either the first or last row of a layer, never the middle row of a layer. A pair of paddles 220 and 222 (FIG. 10) are mounted to the layer sweep blade 170 to squeeze four bundle rows which are the last row of a layer, e.g., rows R3 and R9 of FIG. 4.

The paddles 220 and 222 (FIG. 10) are generally flat plates which extend parallel to the direction of movement of the carriage 152. The paddles 220 and 222 are mounted on shafts 224, 226 and 228, 230, respectively and are fixedly connected therewith. The shafts 224, 226, 228, 230 (see FIG. 10) are slidably mounted in the blade 170 and extend outwardly of the ends 232 and 234 of the blade 170.

The rods 224 and 226 are connected by a follower block 233 and a similar follower block 240 connects the rods 228 and 230. The blocks 233 and 240 ride against cams 250 and 252 (FIG. 5) to control the position of the paddles 220 and 222. Springs 254, 256 and 258, 260 (FIG. 10) bias the paddles 220 and 222, respectively, away from each other and the follower blocks 238 and 240 into engagement with the cams 250 and 252. The cams 250 and 252 are shaped to cause the paddles 220 and 222 to move closer to each other as the cam followers 238 and 240 move across the profile of the cams 250 and 252.

The cams 250 and 252 (FIG. 5) are located along the sides of the path of movement of the blade 170. As the carriage 152 moves forward to move a layer from the layer staging area 28 to the retractable floor 30, the blades 220 and 222 move toward each other to squeeze the last row in the layer being moved to thereby compact the row. The cams 250 and 252 are located along the path of the carriage 152 toward the upstream end. The cams 250 and 252 are shaped to cause the paddles 220 and 222 to squeeze the final row of each layer and then to release the row prior to the time that the layer is in place on the retractable floor 30. The release of the endwise squeeze on the final row of a layer is necessary so that the layer will drop freely when the retractable floor 30 is opened.

The total movement of each paddle 220 and 222 is approximately an inch and three quarters, and the cams 250 and 252 are adjusted to assure that the blades 220 and 222 move the bundles against one another, thereby eliminating any spaces. The paddles 220 and 222 guide the final layer of each row, e.g., rows R3, R6, R9 and R12 (FIGS. 4A–4D), as it is dropped onto the pallet below by limiting endwise movement of the bundles. The paddles 220 and 222 serve this guiding function both when a row of four bundles, e.g., rows R3 and R9 (FIGS. 4A and 4C), is the last row and when rows of three, e.g., rows R6 and R12 (FIGS. 4B and 4D) is the last row.

When the row of four bundles is the first or leading row of the layer, i.e., rows R4 and R10 (FIGS. 4B and 4D), the paddles 220 and 222 (FIGS. 5 and 10) are not effective to squeeze these rows. In order to assure that the rows R4 and R10 are properly compacted, a pair of fixed squeeze plates 270 and 272 (FIGS. 5 and 6) are located adjacent the sides of the retractable floor 30. The squeeze plates 270 and 272 act as a funnel to compact leading rows of four bundles as the layer sweep 150 moves the layer from the layer staging area toward the layer register stop 200. The squeeze plates 270 and 272 have a pair of vertical opposed flat surfaces which are transverse to the direction of movement of the layer sweep 150. The squeeze plates 270 and 272 are oriented to form a gap which has a smaller dimension 274 at its downstream end closer to the layer register stop 200 than its upstream dimension 276 closer to the row staging area 27. The plates 270 and 272 act like a funnel, engaging the opposite ends of a row of four bundles and squeezing the row as it is forced between the two fixed squeeze plates by the row sweep 150.

The squeeze plates 270 and 272 are located centered over the mid-line of the retractable floor 30. In this way a leading row of four bundles such as row R4 or R10 (FIGS. 4B and 4D) is forced between the squeeze plates 270 and 272 (FIG. 6) and is compacted thereby. When the now-compacted row abuts the layer register stop 200, it is free of the squeezing of the plates 270 and 272. In this way the leading row is free of any endwise squeezing and may drop onto the underlying pallet 32.

The squeeze plates 270 and 272 (FIG. 5) are positioned to adjacent the ends of the middle row of a layer, e.g., rows R2 (FIG. 4A) and R5 (FIG. 4B). When the retractable floor 30 (FIG. 1) opens the plates 270 and 272 guide the middle row, limiting any endwise movement of the bundles in these layers, and thus assist in forming a compact layer on the pallet 32.

The retractable floor 30 is formed of two sets of rollers 280 and 282 (FIG. 1). The sets of rollers 280 and 282 are idler rolls and are freely rotatable to facilitate relative movement between the rollers and the bundles above them. The sets of rollers 280 and 282 can be moved away from each other to remove the support from underneath a layer to allow the layer to drop onto a pallet 32 or onto the top of a layer previously deposited on the pallet. Opposite ends of each of the rollers in set 280 are connected with endless chains 284 and 286 which run in grooves (not shown) in the frame of the palletizer 20. The grooves form a track so that when the chains are pulled in one direction, the rollers 280 move laterally, literally pulling the floor out from underneath the bundles above. The set of rollers 282 is connected with similar endless chains 288 and 290 (FIG. 11) which run in grooves 292 and 294, respectively. The set of rollers 282 moves away from the set of rollers 280 when a layer is to be deposited on the pallet 32.

The palletizer 20 (FIG. 1) includes a controller 36. The controller 36 may be any suitable device which can control the sequence of actuation of the various motors and cyliners incorporated in the palletizer 20. One suitable controller is the EPTAK 700 manufactured by Eagle Signal, 736 Federal Street, Davenport, Iowa 52803. The programming of such a controller would be obvious to one of ordinary skill in the art and to avoid prolixity of description will not be described further except in functional terms.

The controller 36 determines the number of bundles to be placed on each pallet. This information may be stored on magnetic tape or in another suitable storage facility. Many pallets going to a single destination may be full with five layers of ten bundles each. But, the last pallet for any given destination may not have a full compliment of bundles. The last layer of such a pallet may have any number of bundles from one to ten.

One consequence which results from the partial layers relates to positioning the partial layer on top of the complete layers. If a partial layer does not have three rows, then the one or two rows of the layer which are present should be moved toward the center of the pallet load for stability. To this end the layer register stop 200 can be moved by cylinders 210 and 212 (FIG. 5) so that the row or rows of a top layer which is a partial layer will be stopped before reaching the edge of the bundles underneath, and so will be offset toward the center of the pile when the retractable floor 30 (FIG. 1) opens to drop them onto the pallet 32 below. Moreover, when a row is a partial row consisting of one (FIG. 12) or two bundles, the row sweep 27 (FIG. 2) is actuated before the bundle(s) reach the row stop 112 with the result that partial rows are offset from the edges of a pallet which are perpendicular to the layer register stop 200 (FIG. 5).

A further consequence of building partial layers relates to the shorter length of time available for the layer sweep 150 to perform its function when a partial layer is being built than when a complete layer is being built. When a complete layer is built, three rows are shifted from the row staging area 26 (FIG. 5) into the layer staging area 28. The first six rollers 140a–140f in the layer staging area 28 are driven by a motor 302. As a result when the rows are shifted by the row sweep 27 into the layer staging area 28, the rollers 140a–140f move the rows toward the retractable floor 30 clearing the rollers 140a–140f of any bundles. This forms a space between the last row of a layer in the layer staging area 28 and the edge of the infeed conveyor 24, as best illustrated in FIG. 11.

The carriage 152 is poised in an initial position approximately over the driven rollers 140a and 140b. The final row of a layer is moved into the layer staging area 28 by the combined effects of the row sweep 27 and driven rollers 140a–140f. When the light 190 and photocell 192 indicate that there are no bundles in the space between the row staging area 26 and the layer staging area 28, the blade 170 drops down, and the carriage 152 advances the layer onto the retractable floor 30 (FIG. 6). The carriage 152 squeezes the layer lengthwise against the layer register stop 200, then backs up slightly to release the layer and waits as the floor 30 (FIG. 1) opens to drop the layer onto a pallet 32 below. Then, the carriage 152 returns to the initial position illustrated in FIG. 11.

Figure 12:
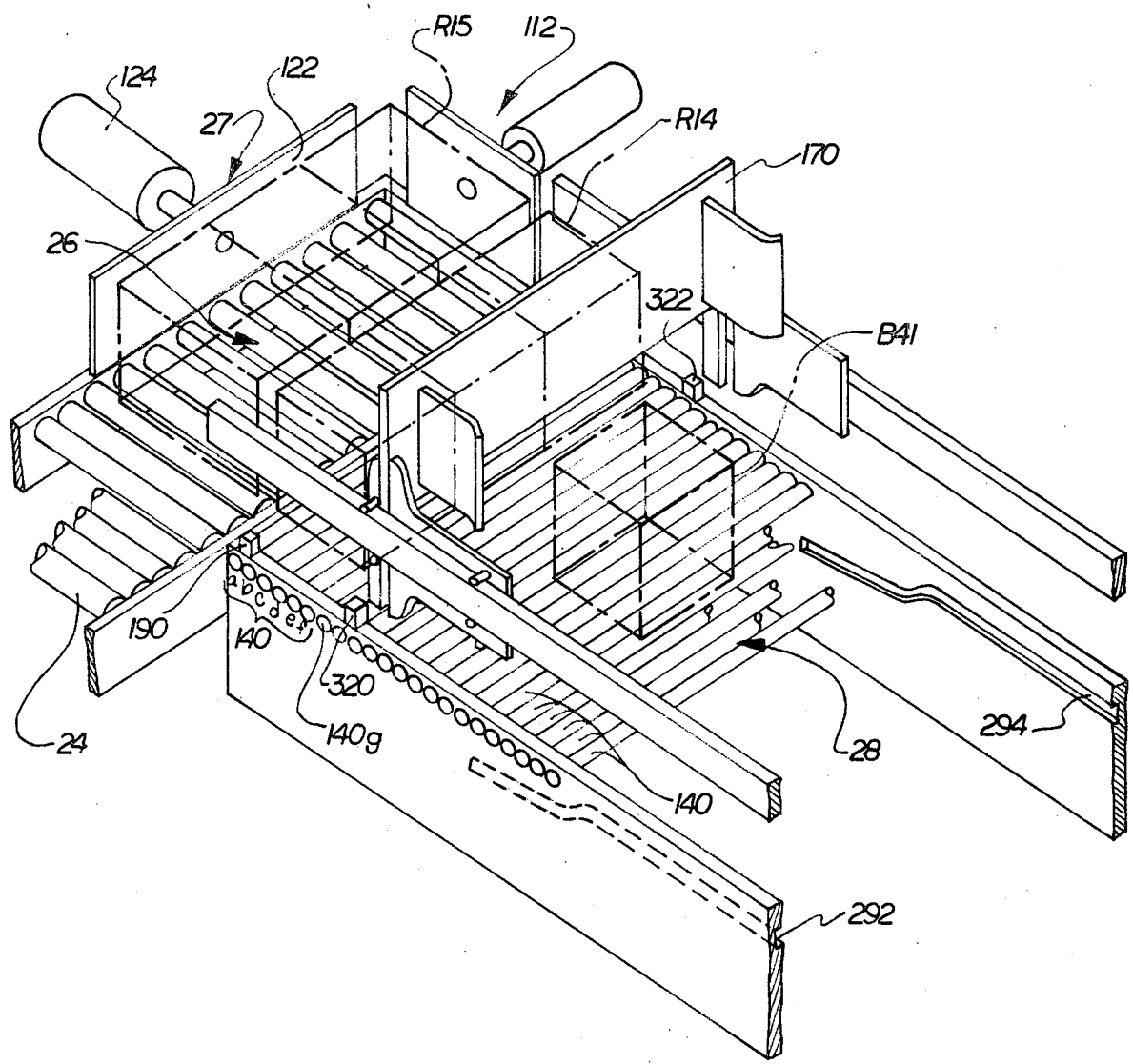
FIG. 12 is a schematic illustration of the layer sweep of FIGS. 7-10 prior to moving a partial layer from the layer staging area onto the retractable floor.

When forming a single bundle layer, the rollers 140a–140f are driven so that the bundle B41 moves past the roller 140g. The rollers 140a–140h are braked immediately after the single bundle layer B41 (FIG. 12) has passed over them into the layer staging area 28 (FIG. 12). When the first row R14 of the following layer is ejected by the row sweep 27, it travels no farther than the rollers 140a–140h because these rollers are braked.

Because the row sweep 27 applies a relatively large force to the bundles, the single bundle B41 travels beyond the first six rollers 140a–140h in the layer staging area 28. The braked rollers 140a–140h hold up the following row R14. As a result, there is a gap located downstream of the driven rollers 140a–140h between the single-bundle layer B41 and the first row R14 of the following layer as illustrated in FIG. 12. The carriage 152 is indexed to a position above this gap. A light source 320 and photo detector 322 determine that the gap is clear, and then the blade 170 is lowered and the single-bundle layer B41 is moved onto the retractable floor.

Thus, the rollers 140a–140h serve to make a gap in either of two locations, depending upon whether a full layer (FIG. 11) or a partial layer (FIG. 12) is being built. In the event a full layer is being built, the rollers 140a–140h are driven to form a gap between the last row of a layer and the row staging area 26 as illustrated in FIG. 11. The carriage 152 is indexed to a position over this gap so that the blade 170 may be lowered down to move the entire layer. In the event that a partial layer (FIG. 12) is being built, after the last bundle or bundles of the partial layer are moved into the layer staging area 28, the rollers 140a–140h are braked so that the next succeeding row does not travel freely into the layer staging area 28. Accordingly, a gap is formed as illustrated in FIG. 12 between the last bundle B41 or row of the partial layer and the first row R14 of the next following layer. The ability to make a gap in either of two locations and to index the carriage 152 to a position over either one of the two locations enables the palletizer 20 to form partial layers without having to slow down or halt the infeed conveyor 24.

While the layer sweep 150 moves a whole layer (layer 1), the next succeeding layer (layer 2) is forming in the layer staging area 28, row by row. This layer (layer 2), if it has a full compliment of ten bundles, takes at least ten seconds to be built, because the bundles arrive at a maximum rate of one per second. Therefore, when building a complete layer, the layer sweep 150 has at least ten seconds to complete its cycle moving layer 1 and return to its initial position poised above the upstream end of the driven rollers 140a–140h ready to move the next layer (layer 2). If the layer sweep 150 takes longer than ten seconds to complete its cycle, the first bundle of the succeeding row will have hit the row stop 112 (FIG. 5), and after thirteen seconds the first row of the succeeding layer (layer 3) will have been pushed onto the layer staging area 28 closing the space behind the last row of the preceding layer (layer 2) into which the blade 170 could be moved to sweep the layer onto the retractable floor 30. A jam would result.

The layer sweep 150 is able to complete its cycle within the ten seconds allowed for whole layers. However, if a succeeding layer (layer 2) is a partial layer, the layer sweep 150 has less time for its cycle. If the partial layer (layer 2) consists only of one bundle B41 (the extreme case, FIG. 12), the layer sweep 150 would have to complete its cycle moving layer 1 and return to move the single-bundle layer (layer 2) in less than four seconds. This is so because the layer sweep would have to move the single-bundle layer onto the retractable floor 30 before the first row of the succeeding layer is pushed by the row sweep 27 into the layer staging area 28.

Thus, the layer sweep 150 must complete its cycle in ten seconds when the palletizer is running at the maximum speed of 60 bundles per minute and when full, complete layers are being built and stacked. When a partial layer is built, such as single bundle layers, the layer sweep must act more quickly.

By braking the rollers 140a–140f and indexing the layer sweep 150 to the position shown in FIG. 12, the layer sweep may take as long as seven seconds to complete moving the layer that preceded layer B41, calculated as follows: one second for bundle B41 to arrive in the row staging area 26 and to be pushed onto the layer staging area 28; three seconds for the row R41 to form in the row staging area 26 and to be moved onto braked rollers 140a–140f, and three seconds for the bundles of row R15 to arrive in the row staging area 26. The layer sweep completes its cycle in less than the seven seconds available when forming single bundle layers and so no jamming occurs and the infeed conveyor 24 does not have to be slowed.

Partial layers having from one to three bundles may be made either by braking rollers 140a–140f and indexing the carriage 152 to the position shown in FIG. 12. Partial layers with from four to six bundles can be made either according to the method for single bundle rows or by indexing the carriage 152 to the position shown in FIG. 11, depending upon the rate at which bundles are fed to the infeed conveyor 24. Partial layers with two complete rows and a partial third row are built in the same manner as complete layers since sufficient time is available for the layer sweep 150 to complete its cycle. A layer with two rows is offset inwardly from the edge of the pallet 32 by actuation of cylinders 210 and 212. A layer with two complete rows and a partial row is not offset, although the bundle(s) forming the partial row may be centered by proper timing of the row sweep 27 (FIG. 11).

Once a layer has been moved out of the layer staging area 28 (FIG. 1) by the layer sweep 150, the retractable floor 30 opens and a first layer is dropped onto the pallet 32. As previously mentioned, the paddles 220 and 222 (FIG. 5), the fixed squeeze plates 270 and 272, and the guide plates 216 and 218 as well as the blade 170 of the layer sweep 150 and the plate 202 of the layer register stop 200 all guide the bundles as they are dropped to keep the bundles in alignment with the pallet below and thus maintain the compact arrangement of the layer as it is dropped.

The pallet 32 (FIG. 1) is supported by an elevator mechanism 400 at a location slightly more than the thickness of a layer below the retractable floor 30. The elevator mechanism 400 includes a rectangular platform 402 and four chains 404 and 406 (only two shown), one at each corner of the platform 402.

The elevator mechanism 400 initially moves the pallet 32 so that it is spaced below the bottom of the retractable floor 30 by a distance approximately equal to the height of the bundle. In this way when the retractable floor 30 opens and drops the bundles downward, the bundles move down onto the pallet 32, and the retractable floor portions 280 and 282 may return immediately to the closed position to receive the next layer. After the first layer is deposited onto the pallet 32, the elevator mechanism 400 lowers the pallet 32 with one layer on it downward a distance equal to the thickness of the next layer. A mechanical sensor or other sensor may be used to locate the top of the bundles on the pallet 32 and to determine how far down the elevator 400 should move after each layer. The process is repeated until as many as five layers of bundles are on the pallet 32.

It is possible to provide a mechanism to feed separator sheets between some or all of the layers on the pallet. A separator sheet of a type suitable for use in the present invention is disclosed in a patent application by James Werkheiser, U.S. Pat. application Ser. No. 246,731 filed Mar. 23, 1981 and assigned to the assignee of the present invention. A separator sheet feeder suitable for feeding such a separator sheet is disclosed in U.S. Pat. application by Mr. Henry Mebus for a U.S. Pat. application Ser. No. 327,901 assigned to the assignee of the present invention.

A supply 410 (FIG. 1) of pallets is moved into a conventional pallet feeder 412 which forms a part of the palletizer 20. Pallets are fed from the bottom of the pile 410 onto the elevator 402 when the elevator is in its lowermost position. The elevator platform 402 has cross bars (not shown) which fit between rollers 416. The rollers 416 are driven to feed the pallet from the bottom of the pile 410 and onto the cross bars of the elevator platform. The pallet moves to the right on the rollers 416 as shown in FIG. 1 until it hits a pallet register stop 420.

Figure 13:
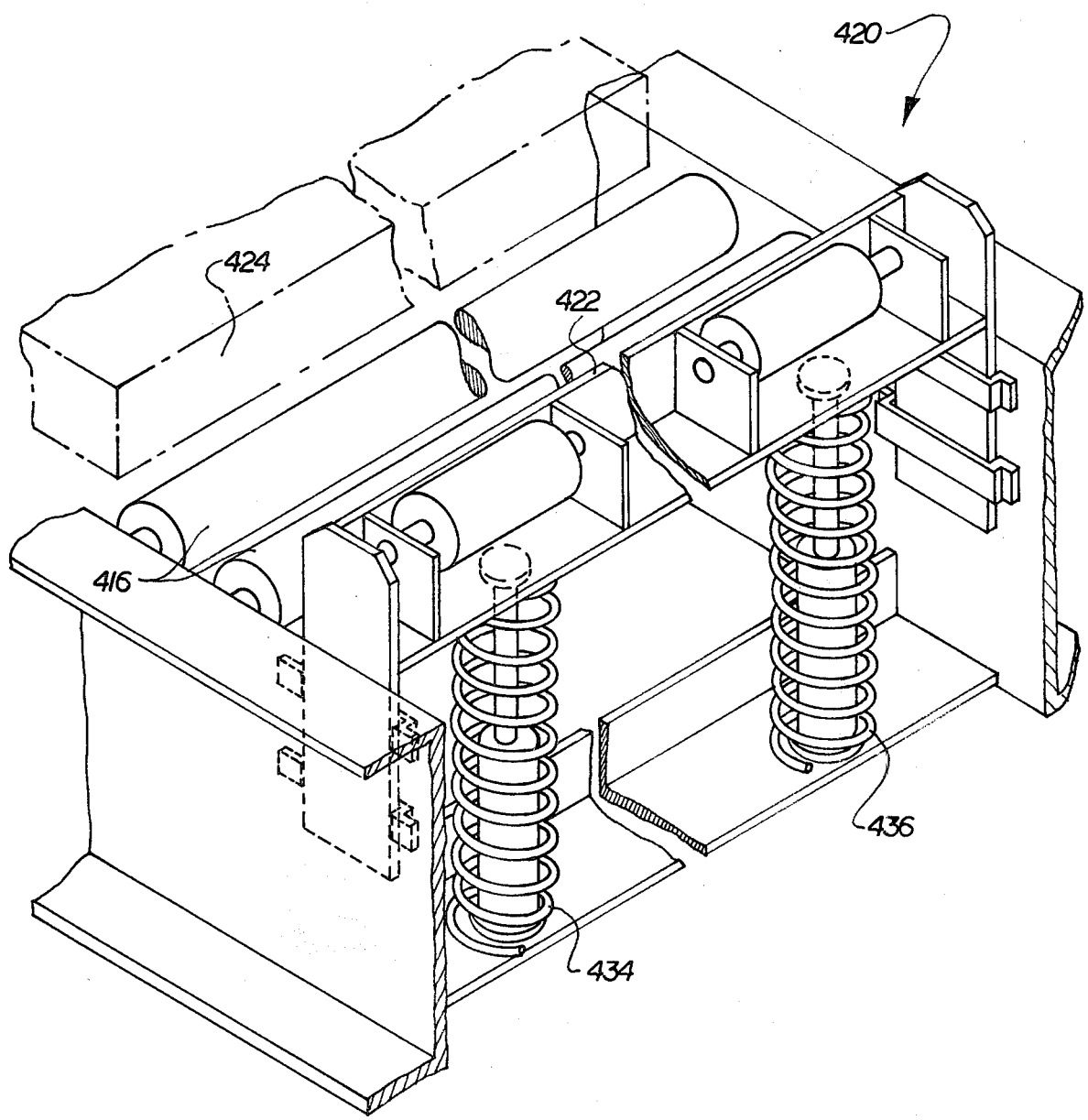
FIG. 13 is a schematic illustration of a pallet register stop forming a part of the palletizer shown in FIG. 1.

The pallet register stop 420 (FIG. 13) includes a stop member 422 which extends upward vertically from the plane of the top of the rollers 416. When the leading edge 424 of the pallet hits the stop member 422, the stop member halts the advance of the pallet. Thereafter, the elevator mechanism 400 is actuated to lift the platform 402 and the pallet 32.

A cam 430 (FIG. 1) is fixed to the frame of the palletizer 20 above the trailing side 432 of the pallet. As the elevator mechanism 400 raises the pallet, the pallet hits the cam 430 which is contoured to move the pallet 32 to the right as viewed in FIG. 1. The cam 430 serves to move the pallet to the desired position centered under the retractable floor 30. In doing so, the cam 430 moves the leading edge 424 of the pallet beyond the register stop 420.

When a pallet 32 is fully loaded with bundles of newspapers, the elevator mechanism 400 lowers the pallet onto rollers 416. Because the cam 430 has moved the pallet to the right, the pallet is now located above the register stop 420. The register stop 420 (FIG. 13) is vertically slidable and is moved downward when a pallet is lowered onto it. The stop member 422 extends above the plane of the rollers 416 and is biased upward by springs 434 and 436. When the fully loaded pallet is lowered by the elevator mechanism 400, the pallet lands on top of the register stop 420 and compresses the springs 434 and 436. The rollers 416 are then driven to feed the loaded pallet out toward the right as viewed in FIG. 1. When the pallet has moved far enough to the right that the trailing edge 434 is beyond the stop 420, the springs 434 and 436 urge the stop upward where it is ready to locate the succeeding pallet. The use of a spring loaded stop 420 together with an overhead cam 430 provides for a very simple mechanism for locating the pallet 32 properly below the retractable floor 430 and for feeding the pallets into and out of the palletizer 20.

Thus it is clear that the present invention provides a pallet loader 20 (FIG. 1) for effectively loading newspaper bundles on pallets. The pallet loader 20 receives a stream of newspaper bundles 22, rotates the bundles according to the desired stacking pattern, forms successive bundles into rows, forms successive rows into layers, and deposits completed layers on top of each other on a pallet 32 until the pallet load is complete. The bundles in each layer are guided as they drop onto the pallet so that they land in the proper position on the pallet. The pallet loader 20 includes a controller 36 which controls the number of bundles loaded onto each pallet. If a pallet for a specific destination requires a number of bundles which does not form a complete number of complete layers, a partial top layer is formed. The pallet loader 20 is able to position the top layer offset inwardly from the edge of the preceeding layers to make a stable stack.

The bundles are received on an infeed conveyor 24 which includes an orientation station 26 where selectively actuatable arms 62, 64 (FIG. 2) rotate the bundles to the required orientation. The bundles, now properly oriented, continue moving on the infeed conveyor 24 and arrive at a row staging area 26 where the bundles are formed into rows. A row sweep 27 moves completed rows transversely to the direction of the infeed conveyor onto a layer staging area 28 (FIGS. 3 and 5). The process is repeated moving successive rows onto the layer staging area 28 until a complete layer is built. A layer sweep 150 then engages the trailing side of the most recently arrived row and moves the entire layer to a position centered above the pallet on a retractable floor. The layer sweep 150 compresses the layer against a backstop 200, and then the retractable floor 30 opens to drop the entire layer onto the pallet.

The layer sweep 150 reciprocates on a track 154, 156 above the layer staging area 28. The layer sweep 150 includes a blade 170 (FIG. 11) which drops down between the last row of the layer to be moved and the first row of the succeeding layer. The layer sweep can start its stroke from either of two positions. The layer sweep makes its longest stroke (FIG. 11) starting from a location adjacent the row staging area 26 when moving a complete layer onto the retractable floor 30. A shorter stroke (FIG. 12) is used when only a partial layer is to be moved. A group of rollers (140a–140f) between the row staging area 26 and the layer staging area 28 may be selectively driven or braked to provide a gap between successive rows into which gap the blade 170 of the layer sweep 150 is lowered.

Each complete layer is formed of two successive rows of three bundles side by side and one row of four bundles end to end, with the row of four being slightly longer than the rows of three because of the proportions of the rectangular bundles. The layer sweep 150 moves the complete layer onto the retractable floor 30, compresses the layer against the layer stop 200 and then backs up slightly to release the layer. The result is that the layer is squeezed and compacted in the direction of movement of the layer sweep 150 and then is free to drop onto the pallet 32.

The longest row of each layer is also squeezed and compacted in the direction perpendicular to the direction of movement of the layer sweep. A pair of fixed squeeze plates 270 and 272 (FIG. 6) adjacent the layer staging area 28 and a pair of cam operated paddles 220 and 222 (FIG. 10) connected with the blade 170 of the layer sweep 150 compact the rows of four lengthwise to assure they are properly located above the pallet below. The rows of three are not compacted because their shorter length permits a larger tolerance in their location, but the paddles 220 and 222, the squeeze plates 270 and 272 and guides 216 and 218 connected to the layer register stop 200 provide outside limits to the lengthwise movement of any row and so guide the bundles as they are dropped onto the pallet 32.

A unique feed mechanism is provided which positions a pallet from a supply 410 (FIG. 1) directly under the retractable floor 30. The pallet is fed onto a lift platform 402 by a conveyor 416. The pallet's movement is halted by a spring loaded pallet register stop 420 (FIG. 13) which extends upward from the conveyor surface to locate the pallet below the retractable floor 30 (FIG. 1) but laterally offset therefrom. As the pallet is lifted on the lift platform 402 to receive bundles it is moved laterally by a cam 430 so that when the full pallet is lowered it lands on top of the register stop 420. The register stop is thereby moved downward to be even with the surface of conveyor rolls 416 and accordingly no longer blocks pallet movement. The full pallet is carried away by the conveyor.

The following is claimed:

1. An apparatus for loading layers of articles to form a stack on a pallet, said apparatus comprising means defining a row staging area in which a stream of articles is formed into rows, each row having a pair of opposed side surfaces and a pair of opposed end surfaces, means defining a layer staging area for receiving the rows of articles from said row staging area and for forming said rows into layers, each layer including a plurality of rows disposed in a side by side arrangement, floor means for supporting said layer over a pallet, means for withdrawing said floor means from over said pallet to drop said layer onto said pallet, guide means for compacting the arrangement of articles in said layer and for maintaining the compact arrangement of said layer as it drops to form said stack on said pallet, said guide means including a layer register stop having surface means defining a first plane disposed vertically for engagement with a side surface of a first row in said layer to limit movement of said layer in a direction transverse to said first plane as said layer drops onto said stack on said pallet, and blade means including surface means defining a second plane generally parallel with said first plane for engaging a side surface of a last row of said layer to limit movement of said layer in a direction transverse to said second plane as said layer drops to form said stack on said pallet, and control means for forming complete rows having a predetermined number of articles in each of said complete rows and for forming complete layers having a predetermined number of complete rows in each of said complete layers, for forming a partial layer having fewer articles than the number of articles in said complete layers, and said guide means including means for guiding said partial layer to drop onto said stack on said pallet, said means for guiding said partial layer to drop onto said stack on said pallet including offsetting means for guiding said partial layer to drop onto said stack on said pallet at a location offset inwardly from an edge of said stack on said pallet, said layer register stop being movable and said offsetting means including means for moving said layer register stop between a location in which said first plane defined by said surface means of said layer register stop is vertically aligned with an edge of said pallet and a location offset inwardly from said edge of said pallet toward the center of said pallet.

2. An apparatus as set forth in claim 1 further comprising layer sweep means including a carriage, guide means for guiding said carriage for movement between said layer staging means and said floor means, and lift means connected with said carriage and said blade for moving said blade from a first position in which said blade is effective to make contact with a side surface of the articles in the last row in a layer as said carriage moves between said layer staging means and said floor means and a second position in which said blade is free of contact with articles as said carriage moves, and wherein said means for forming a partial layer includes means for indexing said carriage to a first location with respect to said layer staging area for moving complete layers from said layer staging area toward said floor means and for indexing said carriage to a second location with respect to said layer staging area for moving partial layers from said layer staging area toward said floor means.

3. An apparatus as set forth in claim 2 wherein said second location of said carriage is between said first location of said carriage and said floor means.

4. An apparatus for loading layers of articles to form a stack on a pallet, said apparatus comprising means defining a row staging area in which a stream of articles is formed into rows, each row having a pair of opposed side surfaces and a pair of opposed end surfaces, means defining a layer staging area for receiving the rows of articles from said row staging area and for forming said rows into layers, each layer including a plurality of rows disposed in a side by side arrangement, floor means for supporting said layer over a pallet, means for withdrawing said floor means from over said pallet to drop said layer onto said pallet, guide means for compacting the arrangement of articles in said layer and for maintaining the compact arrangement of said layer as it drops to form said stack on said pallet, guide means including a layer register stop having surface means defining a first plane disposed vertically for engagement with a side surface of a first row in said layer to limit movement of said layer in a direction transverse to said first plane as said layer drops onto said stack on said pallet, and blade means including surface means defining a second plane generally parallel with said first plane for engaging a side surface of a last row of said layer to limit movement of said layer in a direction transverse to said second plane as said layer drops to form said stack on said pallet, layer sweep means for moving said layer from said layer staging area to said floor means and for squeezing said layer against said layer register stop, said layer sweep means including said blade means, said guide means including first and second opposed paddles connected with said layer sweep means, each of said paddles including surface means for limiting endwise movement of the articles in said last row of said layer as said layer drops to form said stack on said pallet, third and fourth paddles connected with said layer register stop, each of said third and fourth paddles including surface means for limiting endwise movement of the articles in said first row of said layer, a pair of squeeze plates, each of said squeeze plates including surface means for limiting endwise movement of articles in intermediate rows between said first and last rows of said layer as said layer drops to form said stack on said pallet, said surface means on said squeeze plates defining generally vertical surfaces disposed to form a narrowing opening along the path of movement of said layer sweep means from said layer staging area to said floor means, said row staging means including means for making long rows and short rows, and said layer staging means including means for forming a layer including at least one long row, said long row being one of the first and last rows in said layer, said means for moving said first and second paddles toward each other includes means for moving said paddles from a first distance apart which is greater than the length of said long rows to a second distance apart which is greater than the length of said short rows.

5. An apparatus as set forth in claim 4 wherein said squeeze plates are symmetrical about a plane parallel with and midway between said ends of said rows, each of said squeeze plates having a generally vertical downstream edge, said downstream edges being spaced apart a second distance less than said first distance between said upstream edges and greater than the length of said shorter rows.

6. An apparatus as set forth in claim 5 further including means for accurately locating a pallet under said floor means.

7. An apparatus as set forth in claim 6 wherein said means for accurately locating said pallet includes pallet conveyor means for feeding a pallet, pallet register stop means for engaging an edge of the pallet to limit the extent of movement of said pallet on said pallet conveyor means, elevator means for lifting said pallet upward from said conveyor means and returning said pallet to said conveyor means, cam means for moving said pallet laterally on said elevator means to a desired location below said floor means, said pallet register stop means including a stop member, biasing means for urging said stop member upward to extend above said pallet conveyor means, means for slidably mounting said stop member for movement between said upward extended location and a location below said conveyor means, and said cam means having surface means for moving said pallet laterally to a location in which said stop member is below said pallet, whereby when said elevator means lowers said pallet, said stop member moves downward below said conveyor means.

8. An apparatus for palletizing articles, said apparatus comprising infeed means for receiving a stream of articles, means defining a row staging area in which said articles are formed into a series of complete rows having a predetermined number of articles in each row, means defining a layer staging area in which said series of rows are formed in a series of complete layers having a predetermined number of rows in each layer, control means for said row staging area and said layer staging area for forming a partial layer having fewer articles than the number of articles in said complete layers, and means for depositing a first layer onto a pallet, for depositing each of a predetermined number of succeeding complete layers on top of the preceding layer, and for depositing said partial layer on top of the last of said complete layers, said depositing means including means for depositing said partial layer offset inwardly from an edge of said pallet, retractable floor means for supporting a layer of articles over a pallet, reciprocatable carriage means for moving layers from said layer staging area onto said floor means, guide means for guiding said carriage means along a path between said layer staging area and said retractable floor means, and means for retracting said floor means to drop said layer onto said pallet, said carriage means including means for moving said carriage means from a first location relative to said layer staging area along said path toward said retractable floor means to move a complete layer and for moving said carriage means from a second location relative to said layer staging area along said path toward said retractable floor means to move a partial layer, said second location being between said first location and said retractable floor means, and said layer staging area including means for making a space between adjacent rows aligned with one of said first and second locations of said carriage means.

9. An apparatus as set forth in claim 8 wherein said layer staging area includes a plurality of rollers defining a plane and over which said articles may move, and said space making means includes means for selectively driving or braking at least a portion of said rollers.

10. An apparatus as set forth in claim 8 wherein said portion of said rollers is adjacent said row staging area.

11. An apparatus as set forth in claim 8 wherein said control means includes detectors for detecting the presence of spaces at said first and second locations.

12. An apparatus as set forth in claim 8 further including layer register stop means for positioning a layer in alignment with an edge of said pallet.

13. An apparatus as set forth in claim 12 wherein said layer register stop means includes means for depositing said partial layer offset inwardly from an edge of said pallet.

14. An apparatus as set forth in claim 12 wherein said carriage means includes blade means for engaging the articles in the last row of a layer to move the layer from said layer staging area to said retractable floor means and means for moving said blade means into and out of a article engaging position, and said means for moving said carriage includes means for pressing a layer between said blade means and said layer register stop means to compact the arrangement of articles in the layer in the direction of said path of movement of said carriage means.

15. An apparatus as set forth in claim 14 further including means for compacting the arrangement of articles in the layer in a direction transverse to the path of movement of said carriage means.

16. An automatic palletizer including a frame, means for receiving articles and for forming the articles into layers at a predetermined location, platform means for supporting a pallet, conveyor means for moving said pallet along a generally horizontal path onto said platform when said pallet is unloaded and off of said platform when said pallet is loaded with at least one layer of articles, stop means for limiting the extent of movement of said pallet along said path and for positioning said pallet below and laterally displaced from said predetermined location of said layer of articles, lift means for raising and lowering said platform means along a vertical path in said frame, a cam fixed to said frame, said cam including surface means disposed obliquely to said vertical path for moving said pallet laterally to a position in vertical alignment with said layer in said predetermined location, and means for depositing said layer on said pallet, said stop means including a stop member movable between a first position in which said stop member extends above the plane of said conveyor means to limit motion of said pallet along said horizontal path and a second position in which said stop member is below said plane of said infeed conveyor and biasing means for urging said stop member toward said first position, said cam moving said pallet into vertical alignment with said stop member and said pallet being effective to move said stop member to said second position upon being lowered by said lift means.

17. An apparatus for loading layers of articles to form a stack on a pallet, said apparatus comprising means defining a row staging area in which a stream of articles is formed into rows, each row having a pair of opposed side surfaces and a pair of opposed end surfaces, means defining a layer staging area for receiving the rows of articles from said row staging area and for forming said rows into layers, each layer including a plurality of rows disposed in a side by side arrangement, floor means for supporting said layer over a pallet, means for withdrawing said floor means from over said pallet to drop said layer onto said pallet, guide means for compacting the arrangement of articles in said layer and for maintaining the compact arrangement of said layer as it drops to form said stack on said pallet, said guide means including a layer register stop having surface means defining a first plane disposed vertically for engagement with a side surface of a first row in said layer to limit movement of said layer in a direction transverse to said first plane as said layer drops onto said stack on said pallet, and blade means including surface means defining a second plane generally parallel with said first plane for engaging a side surface of a last row of said layer to limit movement of said layer in a direction transverse to said second plane as said layer drops to form said stack on said pallet, layer sweep means for moving said layer from said layer staging area to said floor means and for squeezing said layer against said layer register stop, said layer sweep means including said blade means, said guide means including first and second opposed paddles connected with said layer sweep means, each of said paddles including surface means for limiting endwise movement of the articles in said last row of said layer as said layer drops to form said stack on said pallet, and means for moving said first and second paddles toward each other to squeeze the articles in a row endwise as said layer sweep moves said layer from said layer staging area toward said floor means and for releasing said row from endwise squeezing when said layer is located on said floor means above said pallet.

18. An apparatus for palletizing articles, said apparatus comprising infeed means for receiving a stream of articles, means defining a row staging area in which said articles are formed into a series of complete rows having a predetermined number of articles in each row, means defining a layer staging area in which said series of rows are formed in a series of complete layers having a predetermined number of rows in each layer, control means for said row staging area and said layer staging area for forming a partial layer having a number of rows less than the number of rows in said complete layers, and means for depositing a first complete layer onto a pallet, for depositing each of a predetermined number of succeeding complete layers on top of the preceding layer, and for depositing said partial layer on top of the last of said complete layers, said depositing means including retractable floor means for supporting a layer of bundles over a pallet, reciprocatable carriage means for moving layers from said layer staging area onto said floor means, guide means for guiding said carriage means along a path between said layer staging area and said retractable floor means, and means for retracting said floor means to drop said layer onto said pallet, said carriage means includes means for moving said carriage means from a first location relative to said layer staging area along said path toward said retractable floor means to move a complete layer and for moving said carriage means from a second location relative to said layer staging area along said path toward said retractable floor means to move a partial layer, said second location being between said first location and said retractable floor means.

* * * * *